June 26, 1962 E. W. BYARS 3,040,655
JUICE EXTRACTOR
Filed March 8, 1960 2 Sheets-Sheet 2

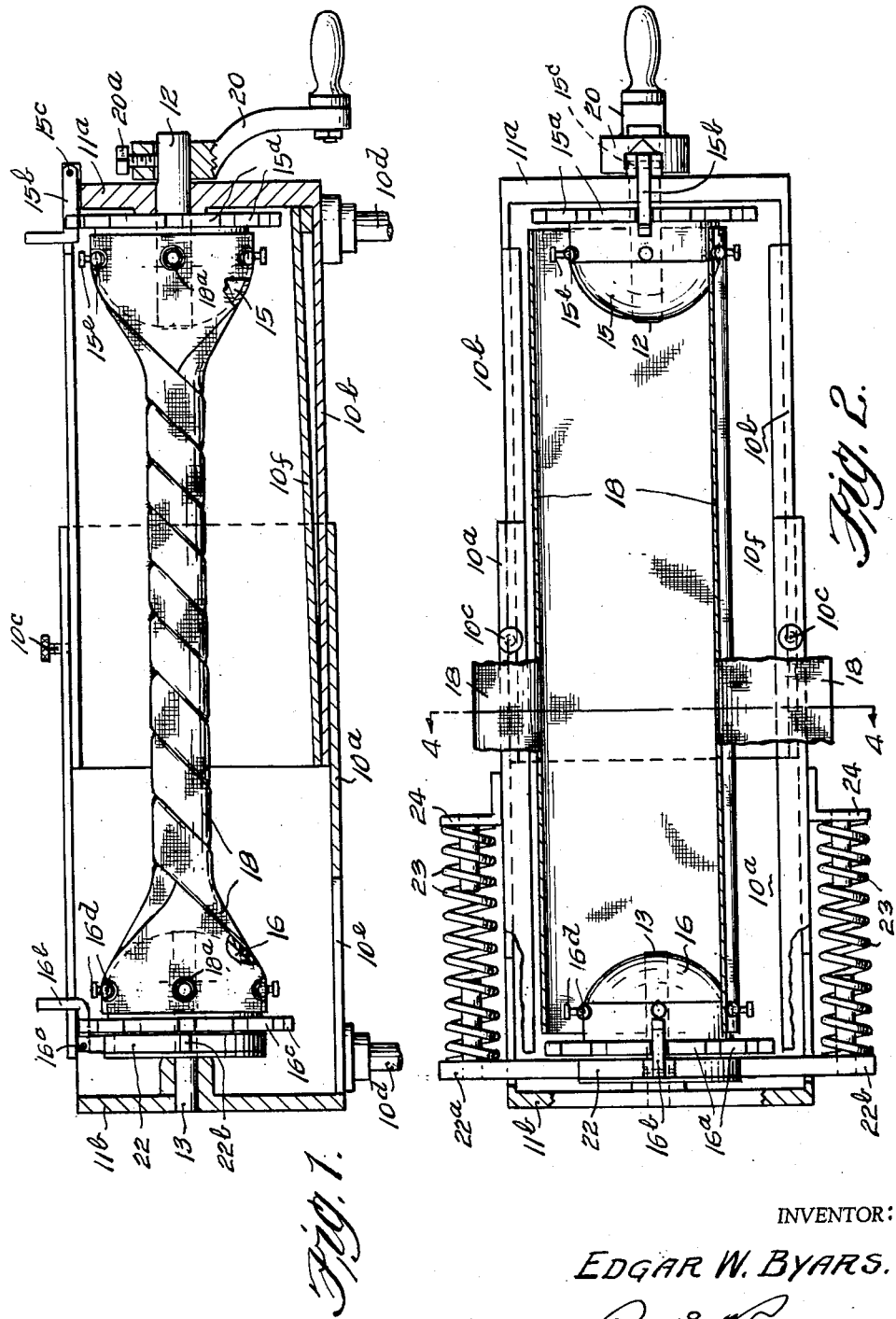

INVENTOR:
EDGAR W. BYARS.
BY
ATTORNEY

United States Patent Office 3,040,655
Patented June 26, 1962

3,040,655
JUICE EXTRACTOR
Edgar W. Byars, 1016 33rd Ave., Tampa, Fla.
Filed Mar. 8, 1960, Ser. No. 13,502
1 Claim. (Cl. 100—122)

The present invention relates to a light weight, inexpensive device for extracting juice from pulp of vegetables and fruit or the like.

The present invention relates to a juice extractor of the general type in which pulped or macerated fruit is placed in a cloth-like sleeve attached at opposite ends to hub portions, one of which may be rotated relative to the other and thereby produce considerable squeezing action on the material within the sleeve and force the juices therefrom to be collected in a trough beneath the sleeve. One of the objects of the invention is the provision of an extractor of the type mentioned by which the sleeve is formed of a sheet which can be progressively attached to the hub supporting the opposite ends thereof whereby the filling of the sleeve with material to be processed and the removal of the processed material; that is, the sleeve can be readily opened longitudinally for access thereto without detaching the sleeve from the hub portions.

Another object of the invention is the provision of an extractor of the type referred to including a trough for receiving fluids extracted from materials in the sleeve, and which trough may be telescoped to occupy a minimum of space when the device is not in use and which can be extended when device is operative.

Other objects and advantages of the invention will be apparent from the following description of a preferred form of the invention, reference being made to the accompanying drawings wherein:

FIG. 1 is a sectional view of a device embodying the invention;

FIG. 2 is a top plan view of the device showing the material-receiving sleeve in its "open" position;

Figure 3:
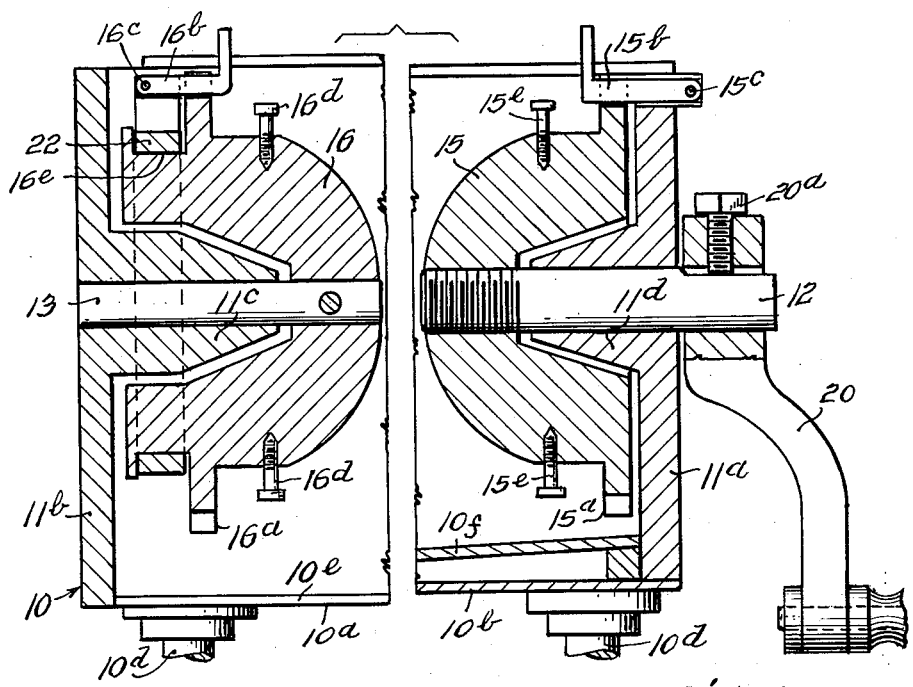
FIG. 3 is a fragmentary sectional view showing opposite end portions of the device.

Referring to the drawings, I have shown a preferred form of my improved extractor which comprises a trough 10 which may be formed of any suitable material, such as sheet metal, and comprising two portions 10a and 10b which are in telescoping relation so that portion 10a may receive portion 10b therein, whereby when the device is not in use section 10b can be moved into section 10a and minimize the size of the device. When the device is to be used, section 10b is withdrawn from section 10a and secured in an elongated or extended position by suitable clamp means such as screws 10c. Suitable legs 10d are provided at opposite ends of trough 10 and they may be arranged to cause the bottom of the trough to slope to the left so that fluid dropping into the trough will flow by gravity to an opening 10e in the bottom of the left hand end of the trough. In the form shown, a false bottom 10f is provided which slopes toward the left to cause liquid to flow toward opening 10e. If desired, the legs 10d can be made to be removable for further compactness of storage of the device.

The ends of the trough are closed by walls 11a and 11b and these walls each have internally projecting bearing portions 11c and 11d respectively, which rotatively support two shafts 12 and 13. Two hubs, 15 and 16, are attached to the inner ends of the respective shafts 12 and 13, and the hubs are arranged to have opposite ends of a rectangular cloth-like sheet 18 attached thereto about the peripheries of the hubs to thereby form a sleeve in which the material to be processed is placed, as is described in more detail hereinafter.

Shaft 12 projects through wall 11a and has a crank 20 attached thereto by a set-screw 20a by which hub 15 can be manually rotated. Preferably, a series of gear-like teeth 15a are formed about the hub and are spaced to receive a latch 15b which is pivoted on a pin 15c journaled in parallel lugs projecting from wall 11a adjacent to a slot formed therein. Latch 15b can be rotated upwardly to release hub 15 for rotation and when it is desired to lock the hub in position, lock 15b is dropped into position between two teeth 15a, as is shown in FIG. 3. Hub 15 also has eight equally spaced radially projecting pins 15e attached therein, which pins have heads for projecting into grommets formed in sheet 18, the purpose of which will appear hereinafter.

Hub 16 has a series of teeth 16a which are similar to teeth 15a of hub 15 and they provide means for receiving a locking member 16b therebetween, which locking member is pivoted on a pin 16c journaled in lugs 16f formed on to a guide yoke 22, explained more fully hereinafter, so that hub 16 may be locked against rotation by dropping the locking member between two teeth 16a, as seen in FIG. 3, and the hub is released by raising the lock. Like hub 15, hub 16 has eight equally spaced radially extending pins 16d to which one end of cloth 18 is attached, which have heads thereon, the purpose of which will be explained hereinafter. Hub 16 has a circular groove 16e formed thereabout which receives a guide yoke 22 made of two complementary parts, which encircles the groove and which has two laterally extending arms 22a and 22b which ride in slots formed longitudinally in the sides of trough section 10a, and the outer ends of which are connected to compression springs 23 located on the outside of trough section 10a by brackets 24 and which tend to urge the yoke to the left, as viewed in FIGS. 1 and 2 and which yieldingly permit movement of the yoke and hub 16 toward the opposite end of the trough, as is explained more fully hereinafter.

Cloth 18 is preferably formed of canvas or other suitable strong cloth-like material and has nine grommets 18a spaced along opposite ends spaced to correspond to the spacing of pins 15e and 16d. The length of the cloth is approximately the distance between the outer portions of the hubs when trough 10 is fully extended, as seen in FIG. 2.

Figures 4, 5:
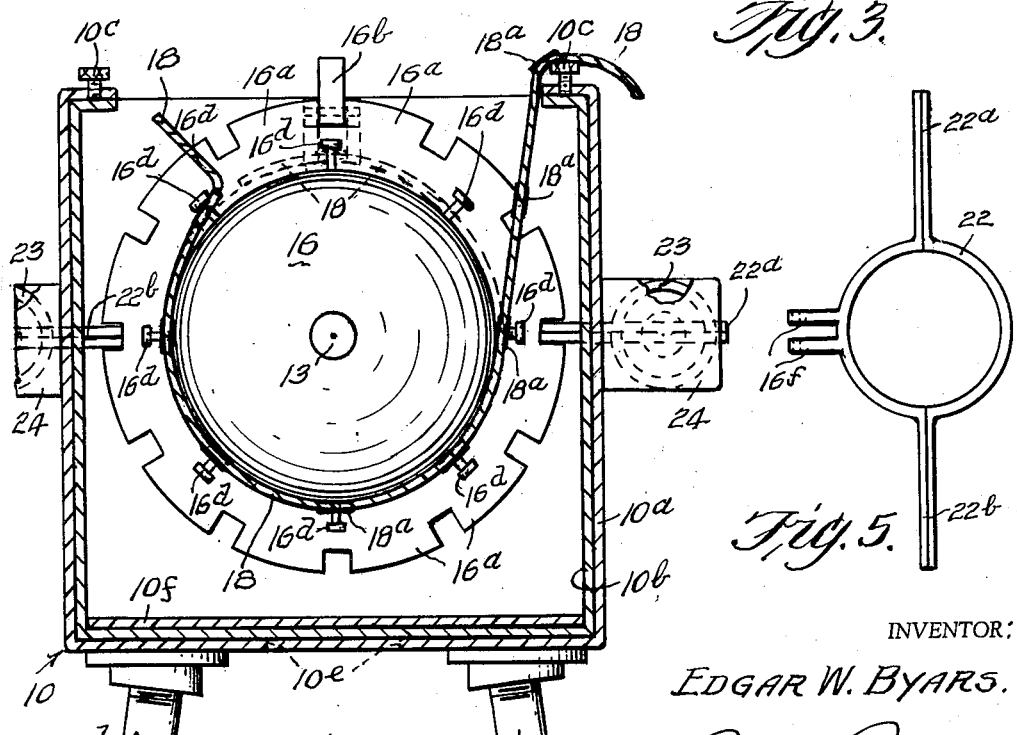
FIG. 4 is a sectional view taken substantially along line 4—4 of FIG. 2.
FIG. 5 is an elevational view of a guide yoke.

In operation of the device, the opposite ends of cloth 18 are attached to the hubs 15 and 16 by hooking the grommets 18a to pins 15e and 16d, starting with the second from the edge, which may be best accomplished by progressively hooking grommets 18a at opposite ends of cloth 18 to the respective pins 15e and 16d, the hubs being revolved to bring the pins upright for ease in securing the grommets thereto. The first and last two grommets are not attached to the hubs so that the cloth forms an open top sling, as seen in FIG. 4. Preferably, the grommets are spaced apart so that a slight tension is maintained on the cloth between pins which retains the grommets in locking engagement with the heads of the pins. Pulped or macerated vegetables or the like may then be deposited through the upper open side of the cloth form and distributed lengthwise therein. The remaining unsecured grommets are then hooked to their respective pins with the two end grommets being secured to the same pin, so that one edge portion of the cloth overlaps the other to enfold the material therein. Lock member 16b is then lowered in place between teeth 16a to prevent rotation of hub 16 and crank 20 is then rotated, which causes twisting of cloth 18 to tightly squeeze the material therein which forces the juices from the material which then drain into trough 10 and out of opening 10e into a suitable receptacle, not shown. As cloth 18 is twisted and tightened, the length thereof tends to shorten and springs 23 permit hub 16 to move toward the other hub under restraint to accommodate for the contraction of the length of the cloth material. Without this arrangement the cloth would tend to knot and lose efficiency in providing uniform pressures on the material therein. When sufficient pressure has been applied to the material in the sleeve, lock member 15b may be dropped into place so that pressure may then be removed from crank 20 to permit the device to stand to allow drainage of the fluids from the cloth.

It will be obvious that by releasing locking member 15b, hub 15 can be rotated to untwist the cloth so that the sleeve can be opened for removal of the pressed pulp and the next batch of wet pulp may then be loaded into the open sleeve for processing as described. When the final batch has been processed, cloth 18 may then be removed from the hubs and washed for sanitary considerations.

While I have described but one form of the invention, it is to be understood that other forms, modifications and adaptations could be employed, all falling within the scope of the claim which follows.

I claim:

In a juice extracting device or the like, means forming a frame, two opposed semi-spherical hub members rotatively supported in spaced relation and in axial alignment on said frame with the spherical portions facing one another, means to rotate one hub member about its axis relative to the other, a flat cloth-like sheet adapted to extend between said hubs and to receive material therein, said hubs having radially extending spaced projections adjacent to the plane of the base of the semispherical portions of said hub, and means forming a plurality of rings spaced along two opposite end edges of said sheet and spaced apart for receiving said projections individually whereby said end edges of said sheet may be progressively attached to said hubs.

References Cited in the file of this patent

UNITED STATES PATENTS

| | | |
|---|---|---|
| 28,752 | Higgins et al. | June 19, 1860 |
| 634,901 | Mönnig | Oct. 17, 1899 |
| 1,188,373 | Ross | June 20, 1916 |
| 2,018,181 | Leo | Oct. 22, 1935 |